W. Hamilton.
Oiling Fast & Loose Pulleys.
Nº 75753 — Patented Mar. 24, 1868.
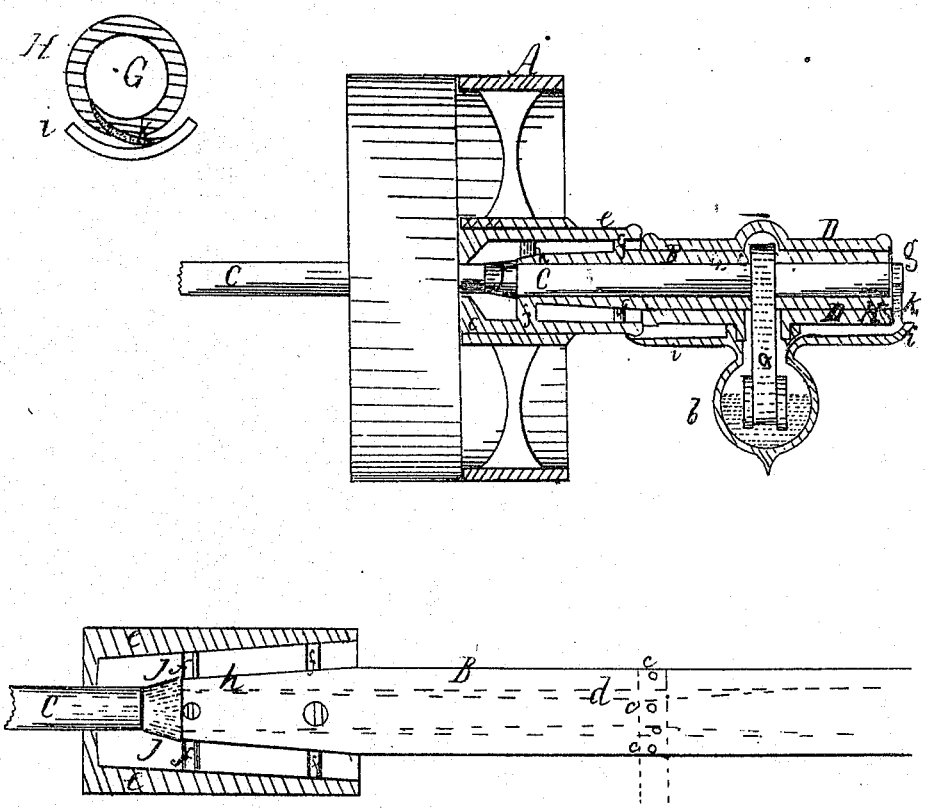
Inventor
William Hamilton
by Gardner & ...
Attorney
Witnesses
Chas. S. Work

United States Patent Office.

WILLIAM HAMILTON, OF CHICOPEE, MASSACHUSETTS.

Letters Patent No. 75,753, dated March 24, 1868.

---

IMPROVEMENT IN DEVICE FOR OILING FAST AND LOOSE PULLEYS.

---

The Schedule referred to in these Letters Patent and making part of the same.

---

TO ALL WHOM IT MAY CONCERN:

Be it known that I, WILLIAM HAMILTON, of Chicopee, Hampden county, Commonwealth of Massachusetts, have invented a new and useful Device for Oiling Fast and Loose Pulleys; and I do hereby declare that the following is a full and clear description thereof, reference being had to the accompanying drawings, and to the letters of reference marked thereon. In the drawings—

Figure 1 is a side and partial sectional view of my invention.

Figure 2, a detailed view of a part, and

Figure 3 a view of the shaft in section with a part of my invention.

This invention consists in a new and improved construction of fast and loose pulley-shafts, in connection with my oiling-device already patented, October 2, 1866, whereby the pulleys may have their bearings oiled by one oil-cup; that is, the bearing entire of the loose pulley, and the bearing at one side of the fast pulley.

In order to accomplish this, I make my loose pulley A fast upon a sleeve, B, fitting over the shaft C, at the bearing on the same side as the pulley A. This sleeve works in the box D, and forms of itself the bearing for this end of the main shaft C. Around the sleeve B passes the chain $a$, from the oil-cup $b$, working in a similar manner as is shown in my patent before mentioned. This oils the bearing of the sleeve B, but in order to get the oil to the main shaft C inside, holes $c$ $c$, &c., are cut through the sleeve, at the part where the chain $a$ comes over it. This admits the oil through into a hollow left around the main shaft at $d$, by cutting or turning the latter down at this point smaller than the diameter of the sleeve. Now that I have accomplished the object of oiling the main shaft, it becomes necessary, for the peculiar oils I use, that the oil should return to the cup after having been used. That used upon the sleeve directly returns in the same manner as is shown in my patent, but to get the oil back into the cup from the inside of the sleeve and around the shaft, I construct the sleeve in a peculiar manner, as I will now describe. The loose pulley A is fastened directly upon a cylinder, $e$ which may form part of or be fastened upon the end of the sleeve B, around the shaft. This cylinder is hollow, and is connected with the end of the sleeve by means of knees $f$ $f$, &c. The object of this chamber in the cylinder is to conduct the oil that comes out of the end of the sleeve B back to the oil-cup. The motive-power for so forcing the oil to make its circuit is the centrifugal force, and this is applied by the following detail of construction in my device: "In every direction which the oil is required to pass, the surfaces of the shaft, sleeve, and cylinder increase in diameter." Thus when the oil falls through the holes in the sleeve B beneath the chain, it drops upon the minimum diameter of the main shaft; it is then carried by the centrifugal force each way from this point to the bearings at $g$ and $h$; the one, $g$, at the end of the shaft, and the other, $h$, at the end of the sleeve, within the cylinder $e$. From the end at $g$ it drops down into the trough $i$, as in my former case, but at $h$ it meets with a sudden enlargement of the shaft C, which then tapers more abruptly the other way, and the oil is crowded to the edge of the enlarged portion $j$, from which it drops to the inside surface of the cylinder $e$, which tapers also, enlarging as it is nearer the oil-cup, at this point the end of the sleeve is also tapered in the same direction, so that wherever the oil falls, it is conducted by centrifugal force towards the outer edge of the cylinder $e$, from which it drops into the trough $i$, and reaches the oil-cup.

In fig. 3 is shown a small device for conducting the escaped oil more perfectly back into the trough, from the main shaft. G is the shaft, shown in cross-section. H is the end of the box, and the end of the trough $i$, extending out a little beyond it, as is shown in fig. 1 at H. $k$ is a tongue of spring-metal, fastened at the lower end to the trough, and having its other end pressing upon the surface of the shaft at $m$. This serves to cut the oil from passing further on the shaft, and renders its conduct to the trough sure.

Now having described my invention, what I claim as new, and desire to secure by Letters Patent, is—

1. The sleeve B, with hollow cylinder $e$, constructed as shown, and arranged upon the shaft C, substantially in the manner and for the purpose described.

2. In combination with the sleeve B, the shaft C, formed as shown, with the taper and projection $j$, substantially as set forth.

3. The tongue $k$, when connected with a dripping-trough, $i$, for the purpose and in the manner shown.

WM. HAMILTON.

Witnesses:
E. H. HYDE,
CHARLES P. DEAM.